United States Patent
Meheen (10) Patent No.: US 7,089,963 B2
(45) Date of Patent: Aug. 15, 2006

(54) FLOW LAMINARIZING DEVICE

(76) Inventor: David Meheen, 325 N. Oregan Ave., Pasco, WA (US) 99301

( * ) Notice: Subject to any disclaimer, the term of this patent is extended or adjusted under 35 U.S.C. 154(b) by 141 days.

(21) Appl. No.: 10/768,476

(22) Filed: Jan. 30, 2004

(65) Prior Publication Data
US 2005/0263199 A1 Dec. 1, 2005

Related U.S. Application Data (63) Continuation-in-part of application No. 10/305,298, filed on Nov. 26, 2002, now abandoned.

(51) Int. Cl.
F15D 1/02 (2006.01)

(52) U.S. Cl. ............................ 138/44; 138/37; 138/39; 138/40

(58) Field of Classification Search ................. 138/44, 138/39, 37, 40; 73/861.52; 239/590.3, 461
See application file for complete search history.

(56) References Cited

U.S. PATENT DOCUMENTS

| | | | | |
|---|---|---|---|---|
| 772,279 | A * | 10/1904 | Grouvelle et al. ........... 165/177 |
| 2,688,985 | A * | 9/1954 | Holdenried ................... 138/37 |
| 2,825,203 | A * | 3/1958 | Bertin et al. .................... 60/249 |
| 2,929,248 | A * | 3/1960 | Sprenkle ....................... 73/198 |
| 3,266,437 | A | 8/1966 | Blackmore et al. ........... 138/41 |
| 3,545,492 | A * | 12/1970 | Scheid, Jr. .................... 138/42 |
| 3,572,391 | A * | 3/1971 | Hirsch .......................... 138/40 |
| 3,635,580 | A | 1/1972 | Richardson et al. ........ 415/150 |
| 3,645,298 | A * | 2/1972 | Roberts et al. ............... 138/40 |
| 3,840,051 | A * | 10/1974 | Akashi et al. ................ 138/37 |
| 3,964,519 | A * | 6/1976 | De Baun ....................... 138/37 |
| 4,142,413 | A * | 3/1979 | Bellinga ....................... 73/198 |
| 4,656,975 | A | 4/1987 | Johnson .................... 123/41.68 |
| 4,786,185 | A * | 11/1988 | Knief .......................... 366/340 |
| 5,255,716 | A * | 10/1993 | Wilcox ......................... 138/44 |
| 5,392,815 | A * | 2/1995 | Stuart .......................... 138/37 |
| 5,482,249 | A * | 1/1996 | Schafbuch et al. ......... 251/118 |
| 5,495,872 | A * | 3/1996 | Gallagher et al. ............ 138/44 |
| 5,529,093 | A * | 6/1996 | Gallagher et al. ............ 138/44 |
| 5,664,760 | A * | 9/1997 | Army et al. ................ 251/118 |
| 5,762,107 | A * | 6/1998 | Laws .......................... 138/44 |
| 6,145,544 | A * | 11/2000 | Dutertre et al. ............... 138/39 |
| 6,186,179 | B1 * | 2/2001 | Hill ............................. 138/39 |
| 6,273,677 | B1 | 8/2001 | Wang et al. ................ 415/191 |
| 6,807,986 | B1 * | 10/2004 | Boger ......................... 138/44 |
| 6,880,579 | B1 * | 4/2005 | Boger ......................... 138/44 |

* cited by examiner

Primary Examiner—Patrick Brinson
(74) Attorney, Agent, or Firm—Reidlaw, L.L.C.; John S. Reid (57) ABSTRACT

Representative embodiments provide for a flow laminarizing device including a plurality of walls defining a plurality of passageways, each passageway defining a hexagonal cross-sectional area and configured to permit fluid flow there through, a casing configured to mechanically support the plurality of walls, and at least one support extension mechanically coupled to the casing, the at least one support extension and the casing cooperatively configured to support the flow laminarizing device in a substantially fixed slidingly received position relative to a fluid flow port of a fluid impelling device. A method includes the steps of decoupling an air line from a turbocharger, installing a flow laminarizing device in fluid communication with the turbocharger, and recoupling the air line to the turbocharger.

11 Claims, 10 Drawing Sheets

FLOW LAMINARIZING DEVICE

CROSS REFERENCE TO RELATED APPLICATIONS

The present invention is a continuation-in-part of, and claims priority under 35 U.S.C. § 120 to, U.S. patent application Ser. No. 10/305,298, filed Nov. 26, 2002, now abandoned which is hereby incorporated by reference herein in its entirety.

BACKGROUND

Turbochargers are commonly known devices for increasing the air mass in the combustion chambers (cylinders) of an internal combustion engine, particularly, but not limited to, diesel engines. The turbocharger is most frequently driven by exhaust gasses or a mechanical drive which are used to drive an impeller. The impeller is attached by a shaft or other coupling to a compressor wheel, which is used to compress ambient air which is then provided to the combustion chambers of the engine. Other kinds of fluid impelling devices use one or more impellers to induce fluid flow through centrifugal force.

Therefore, it is desirable to improve the performance of turbochargers and other kinds of fluid impelling devices.

SUMMARY

One embodiment provides for a flow laminarizing device that includes a first plurality of walls configured to define a second plurality of passageways. Each of the passageways defines a passage length and a hexagonal cross-section. Furthermore, each of the passageways is configured to permit fluid flow there through. The flow laminarizing device also includes a casing, which is configured to mechanically support the first plurality of walls. The casing defines a casing length that is substantially equal to the passage length of each of the passageways. The flow laminarizing device also includes at least one support extension mechanically coupled to the casing. The at least one support extension and the casing are cooperatively configured so as to support the flow laminarizing device in a substantially fixed, slidingly-received position relative to a fluid flow port of a fluid impelling device.

Another embodiment provides for a flow laminarizing device including, a plurality of walls configured to define a plurality of passageways. Each of the passageways defines a passage length and is configured to permit fluid flow there through. The flow laminarizing device also includes a housing that is configured to mechanically support the first plurality of walls. The flow laminarizing device further includes at least one support extension mechanically coupled to the housing. The at least one support extension and the housing are cooperatively configured so as to support the flow laminarizing device in a substantially fixed position relative to the fluid flow port of a fluid impelling device.

Yet another embodiment provides for a method, the method including the steps of providing an engine, the engine including a fluid feed line and a fluid impelling device. The method also includes the step of decoupling the fluid feed line out of cooperative orientation with the fluid impelling device. The method further includes the step of supportingly positioning a flow laminarizing device in fluid communication with the fluid impelling device. The method also includes the step of recoupling the fluid feed line into cooperative orientation with the fluid impelling device.

These and other aspects and embodiments will now be described in detail with reference to the accompanying drawings, wherein:

DETAILED DESCRIPTION

Currently, the air entering the compressor wheel (i.e., impeller) of a turbocharger in automotive (and other) applications passes through an air filter and air passageways with various bends and restrictions before entering the impeller. These restrictions and bends in the air passageway cause the air actually entering the impeller intake to be turbulent, resulting in less than optimum efficiency (i.e., performance) of the impeller of the turbocharger. Further due to the compressor wheel (i.e., impeller) rotation, incoming air tends to swirl in the same direction as the rotation of the compressor wheel adding to its inefficiency. Consequently, a given turbocharger typically provides, for example, an air compression ratio (i.e., the ratio of outlet pressure to inlet pressure) that is less than optimum for the given turbocharger.

This less-than-optimum performance generally extends to other kinds of fluid impelling devices for reasons similar to those presented above. Such other fluid impelling devices include, but are not limited to, the following: superchargers; centrifugal pumps; centrifugal fans; single-stage gas compressors; multistage gas compressors; and other kinds of devices which generally use one or more rotating elements to compress gases and/or induce fluid flow.

In representative embodiments, the present teachings provide methods and apparatus for laminarizing a fluid flow to a turbocharger, supercharger, or other fluid impelling device, typically improving the fluid flow performance of the fluid impelling device and thereby improving one or more other performance aspects of the system that the fluid impelling device is a part of. As a non-limiting example, an appropriate embodiment of the flow laminarizing device can be cooperatively applied to a turbocharger of a diesel engine of an automobile, pickup truck, or other engine-equipped machinery (such as a generating set, mining equipment, etc.). In such an example, application of the flow laminarizing device typically results in a relatively increased combustion air flow through the turbocharger and into the cylinders of the diesel engine. Such increase in combustion air flow further results in improved fuel combustion, a reduction of un-combusted fuel and/or other compounds within the engine exhaust, increased engine horsepower and/or torque, reduced overall fuel consumption under typical operation, reduced overall exhaust emissions, etc., relative to that which occurs when the same automobile or machine is operated without the flow laminarizing device.

Figure 1:
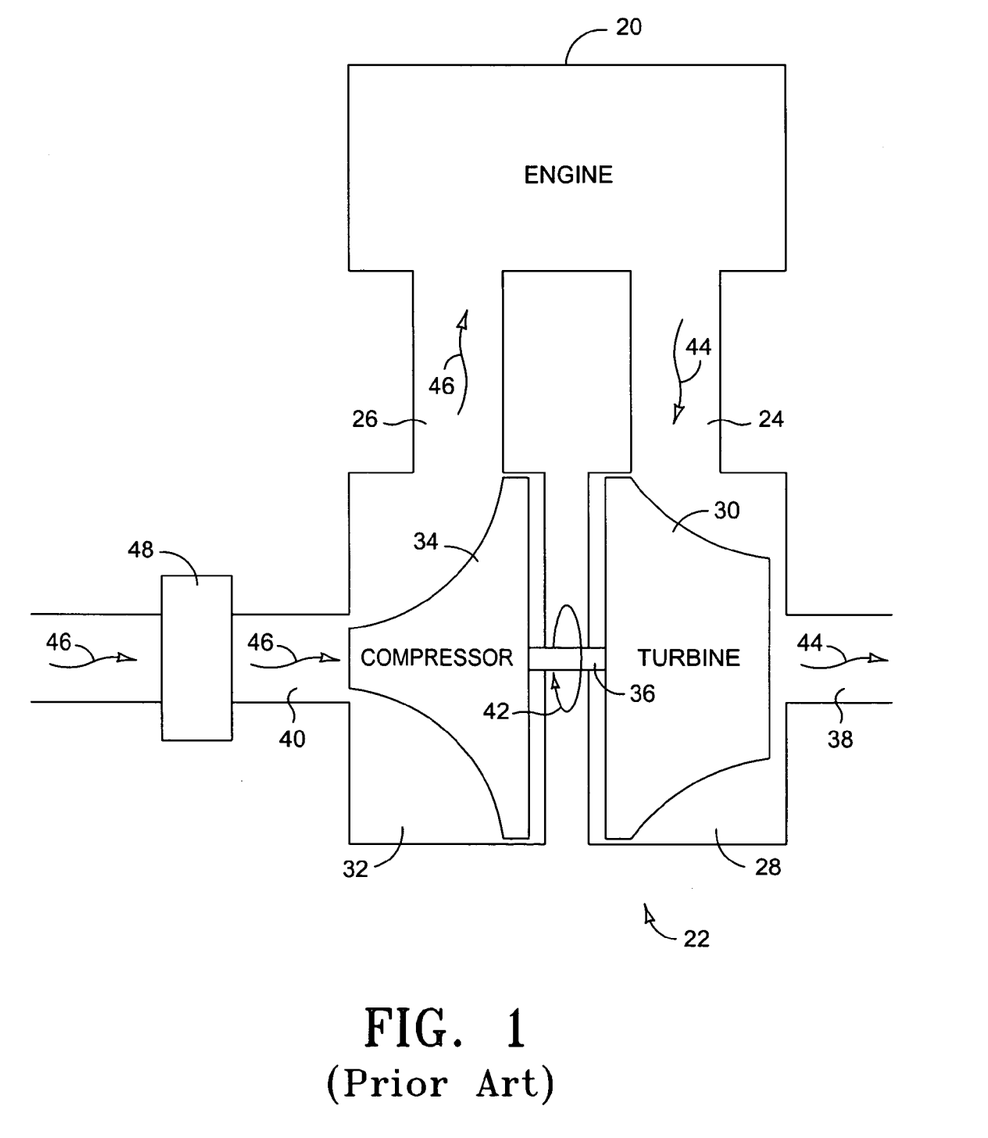
FIG. 1 is a schematic view depicting an engine and turbocharger combination in accordance with the prior art.

Turning now to FIG. 1, wherein a schematic view depicts an engine 20 and an associated turbocharger 22, in accordance with the prior art. The engine 20 can be a diesel engine or a conventional gasoline engine. Generally, the engine 20 can be any type of internal combustion engine requiring an inlet flow of combustion air and producing an outlet flow of combustion exhaust gasses. The engine 20 is fluidly coupled to the turbocharger 22 by way of an exhaust gas conduit 24 and a combustion air conduit 26.

The turbocharger 22 includes a turbine chamber 28, which houses a turbine 30. The turbocharger 22 further includes a compression chamber 32, which houses an impeller 34. The turbine 30 is mechanically coupled to the impeller 34 by way of a rotatable shaft 36. The turbocharger 22 further includes an exhaust gas outlet 38 and an ambient air inlet 40.

Cooperation of the engine 20 and the turbocharger 22 is performed generally as follows: The engine 20 produces a flow of combustion exhaust gasses 44 that are coupled to the turbine chamber 28 by way of the exhaust conduit 24. The flow of exhaust gasses 44 drives a rotation 42 of the turbine 30. The exhaust gasses 40 continue to flow through the turbine chamber 28 and out of the turbocharger 22 by way of exhaust gas outlet 38.

The rotation 42 of the turbine 30 is coupled to the impeller 34 by way of the shaft 36. The impeller 34, thus rotating, impels (i.e., drives or induces) a flow of ambient air 46 into the compression chamber 32 by way of inlet 40. As shown in FIG. 1, the ambient air 46 is drawn through a filter 48 prior to flowing into the compression chamber 32. The ambient air 46 then continues to flow from the turbocharger 22 by way of the combustion air conduit 26, and is consumed in combustion by the engine 20.

The impeller 34 generally compresses the ambient air 46 within the compression chamber 32, resulting in an increase in pressure of the ambient air 46 at the combustion air conduit 26 (i.e., outlet pressure), relative to that of the ambient air inlet 40 (i.e., inlet pressure). As discussed briefly above, the performance of the turbocharger 22 (or any other fluid impelling device) can be expressed as a ratio of the outlet pressure to the inlet pressure, referred to herein as the performance ratio. Moreover, the performance ratio can be considered as indicative of the overall efficiency (or efficacy) of the turbocharger 22 (or another fluid impelling device).

As introduced above, turbulence within a fluid flow can result in a less-than-optimum performance ratio for a given fluid impelling device. In one case, for example, a swirling of the fluid in a direction counter to the rotation of the impeller can result in excessive drag. In another exemplary case, the fluid flow has a velocity profile relative to the cross-section of the flow-containing conduit, which is less than ideal for introduction to an impeller. Other aspects of turbulence within a fluid flow can have an undesired effect on the performance ratio of a fluid impelling device.

Figure 2:
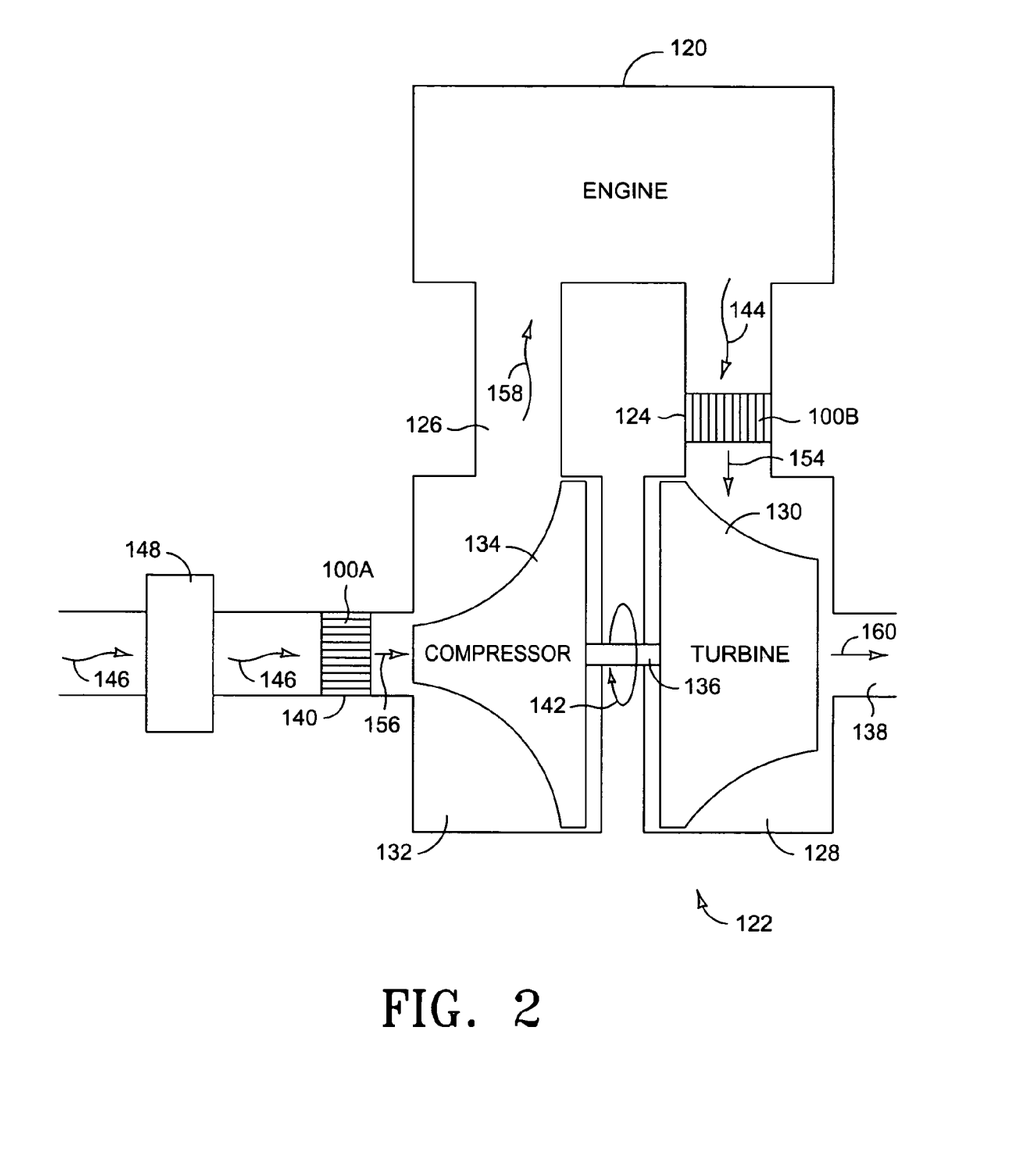
FIG. 2 is a schematic view depicting an engine and turbocharger combination including a pair of flow laminarizing devices in accordance with one embodiment of the invention.

FIG. 2 is a schematic view depicting an engine 120 and an associated turbocharger 122, in accordance with an embodiment of the present invention. The engine 120 and the turbocharger 122 are coupled by way of an exhaust conduit 124 and a combustion air conduit 126. The turbocharger 122 includes a turbine chamber 128, a turbine 130, a compression chamber 132, an impeller 134, and a rotatable shaft 136, which function and cooperate substantially as described above for elements 28, 30, 32, 34 and 36, respectively.

Further depicted in FIG. 2 are a pair of flow laminarizing devices 100A and 100B, respectively. The flow laminarizing device 100A is shown installed in an ambient air inlet 140, generally in close adjacency to the impeller 134 of the turbocharger 122. The flow laminarizing device 100B is installed in an exhaust gas conduit 124, in generally close adjacency to the turbine 130 of the turbocharger 122.

Cooperation of the engine 120, the turbocharger 122 and the flow laminarizing devices 100A and 100B is performed generally as follows: Exhaust gasses 144 flow from the engine 120 and toward the turbine chamber 128 by way of the exhaust gas conduit 124. The exhaust gasses 144 flow through the flow laminarizing device 100B, which operates to substantially laminarize, or reduce any turbulence within, the flow of gasses 144 resulting in a laminarized exhaust gas flow 154. The laminarized gas flow 154 enters the turbine chamber 128 and drives a rotation 142 of the turbine 130. The exhaust gasses 144 then flow from the turbocharger 122 as exhaust discharge flow 160, by way of an exhaust gas outlet 138.

The impeller 134, rotating by way of the shaft 136, impels ambient air 146 to flow through a filter 148 and toward the compression chamber 132. The ambient air 146 flows through the flow laminarizing device 100A, which operates to laminarize the flow of air 146, resulting in a laminarized air flow 156. The laminarized air flow 156 enters the compression chamber 132 and is compressed by the impeller 134. The compressed ambient air 158 flows from the turbocharger 122 by way of the combustion air conduit 126, and is consumed by the engine 120.

The flow laminarizing device 100A generally increases the performance ratio (i.e., pressure ratio of compressed air 158 to laminarized air 156) of the turbocharger 122. Similarly, the flow laminarizing device 100B generally increases the efficiency of the turbine 130, such that the exhaust gasses 144 impart a reduced back pressure against the engine 120. In any case, the flow laminarizing devices 100A and 100B serve to generally improve, and can substantially optimize, the overall performance (i.e., the performance ratio) of the turbocharger 122.

As depicted in FIG. 2, the turbocharger 122 operates in conjunction with both flow laminarizing devices 100A and 10B. In another embodiment (not shown in FIG. 2), only the flow laminarizer 100A or 100B can be present, with the flow laminarizer 100A typically being selected for installation in a single-laminarizing-device embodiment. Other arrangements associated with other embodiments are possible.

Figure 3:
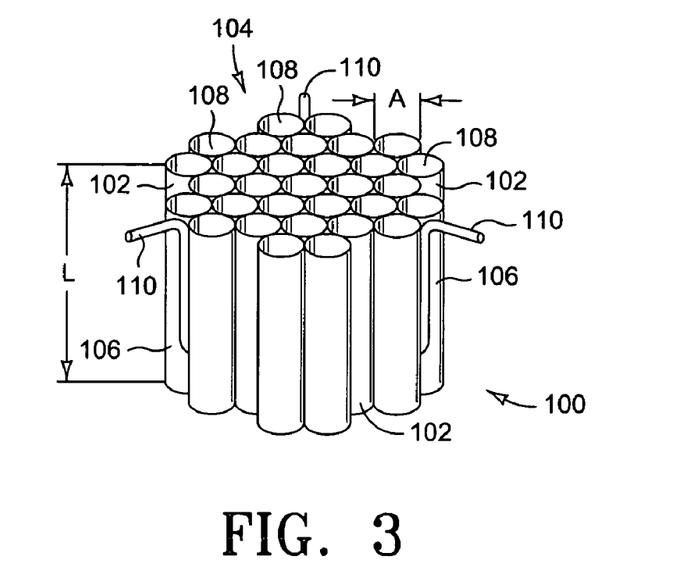
FIG. 3 is a perspective view depicting a flow laminarizing device in accordance with another embodiment of the invention.

FIG. 3 is a perspective view of a flow laminarizing device 100, in accordance with another embodiment of the present invention. Embodiments of the flow laminarizing device 100 can be utilized, for example, as devices 100A and/or 100B of FIG. 2.

The flow laminarizing device 100 includes a plurality of tubes 102, which are coupled in a mutually parallel arrangement, generally defining a single array or cluster 104. Each of the tubes 102 includes a wall (or sidewall) 106, defining a passageway 108 that is configured to permit a fluid to flow there through. Each passageway 108 further has a length L and a cross-sectional area A, defined by the wall 106 of the corresponding tube 102. The plurality of tubes 102 can be formed of stainless steel, aluminum, or another suitable metal. Alternatively, the tubes 102 can be formed from plastic, nylon, a fiber and resin composite, or any other natural or synthetic material that is suitable for the application at hand (i.e., use with a turbocharger or another fluid impelling device).

The flow laminarizing device 100 further includes a plurality of retaining elements 110. The retaining elements 110 of the device 100 are typically uniformly spaced about the periphery of the array 104, and extend radially away there from. As depicted in FIG. 3, the retaining elements 110 have an overall "L" shape; it is understood that other forms of retaining elements corresponding to other embodiments of the invention are possible. The retaining elements 110 are configured to support, or maintain, the flow laminarizing device 100 in a substantially fixed position with respect to a location of use (not shown in FIG. 3; refer to FIG. 4). The retaining elements 110 can be formed from any material suitable for use with the plurality of tubes 102 and/or the application at hand.

Figure 4:
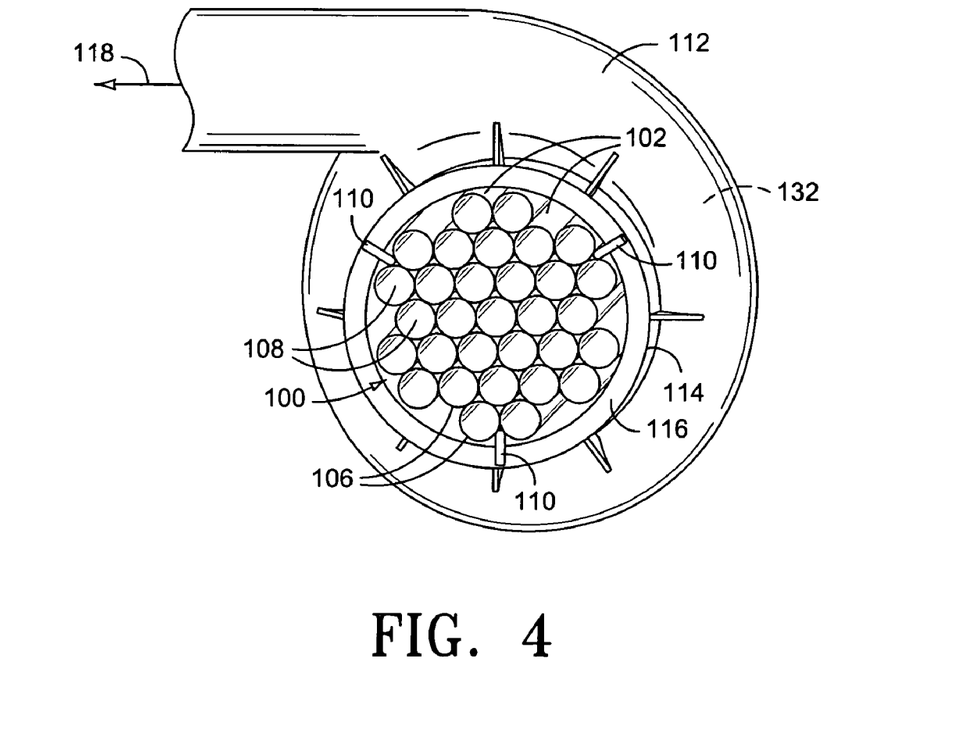
FIG. 4 is a perspective view depicting a turbocharger and the flow laminarizing device of FIG. 3.

FIG. 4 is a perspective view depicting the flow laminarizing device 100 of FIG. 3, in typical usage combination with a turbocharger 112. As depicted, the turbocharger 112 includes an inlet or throat 114. The flow laminarizing device 100 is received in the inlet 114, being maintained in place by cooperation of the retainer elements 110 with an edge or lip 116 of the inlet 114.

In typical operation, an ambient air conduit (not shown) fluidly couples air with the flow laminarizing device 100 and the turbocharger 112. At least a portion of the air flowing toward the inlet 114 of the turbocharger 112 passes through the passageways 108 and exits the flow laminarizing device 100 as a substantially laminar air stream. The laminar air stream continues through the remainder of the inlet 114, and into an air compression chamber 116 of the turbocharger 112. An impeller (not shown) of the turbocharger 112 generally compresses the air flow, and discharges it along a path 118 for consumption by an engine (not shown).

Performance of the flow laminarizing device 100 can be generally characterized as follows: An increase in the number of tubes 102 (i.e., increase in the number of corresponding passageways 108) within an array 104 of a substantially constant overall size typically increases the flow laminarizing effect of the device 100, but also typically increases drag on the fluid flowing there through (i.e., fluid drag) due to an increase in the surface area (tube length times tube inside circumference) which the air can contact in passing through the device. An increase in the length "L" of the tubes typically increases both the flow laminarizing effect and the fluid drag of the particular passageway 108. An increase in the surface roughness of the wall 106 defining the passageway 108 will decrease the flow laminarizing effect. Conversely, an increase in the cross-sectional area A typically results in a decrease of both the flow laminarizing effect and the fluid drag of the particular passageway 108.

Other effects resulting from the number of tubes 102 (i.e., passageways 108) and their associated characteristics and dimensions can also be present; however, it those effects stated above that are of primary concern herein. In any case, it is generally desirable to realize an embodiment of the flow laminarizing device 100 such that a ratio of the flow laminarizing effect, to the fluid drag there produced, is optimized for the application at hand—that is, the kind and size of fluid impelling device, type of flowing fluid, location of the flow laminarizing device relative to the fluid impelling device, etc. Such design optimization typically requires an iterative approach, and the acquisition of empirical data associated with the application at hand. This topic will be discussed more fully below with respect to FIGS. 9A–9F.

Figure 10:
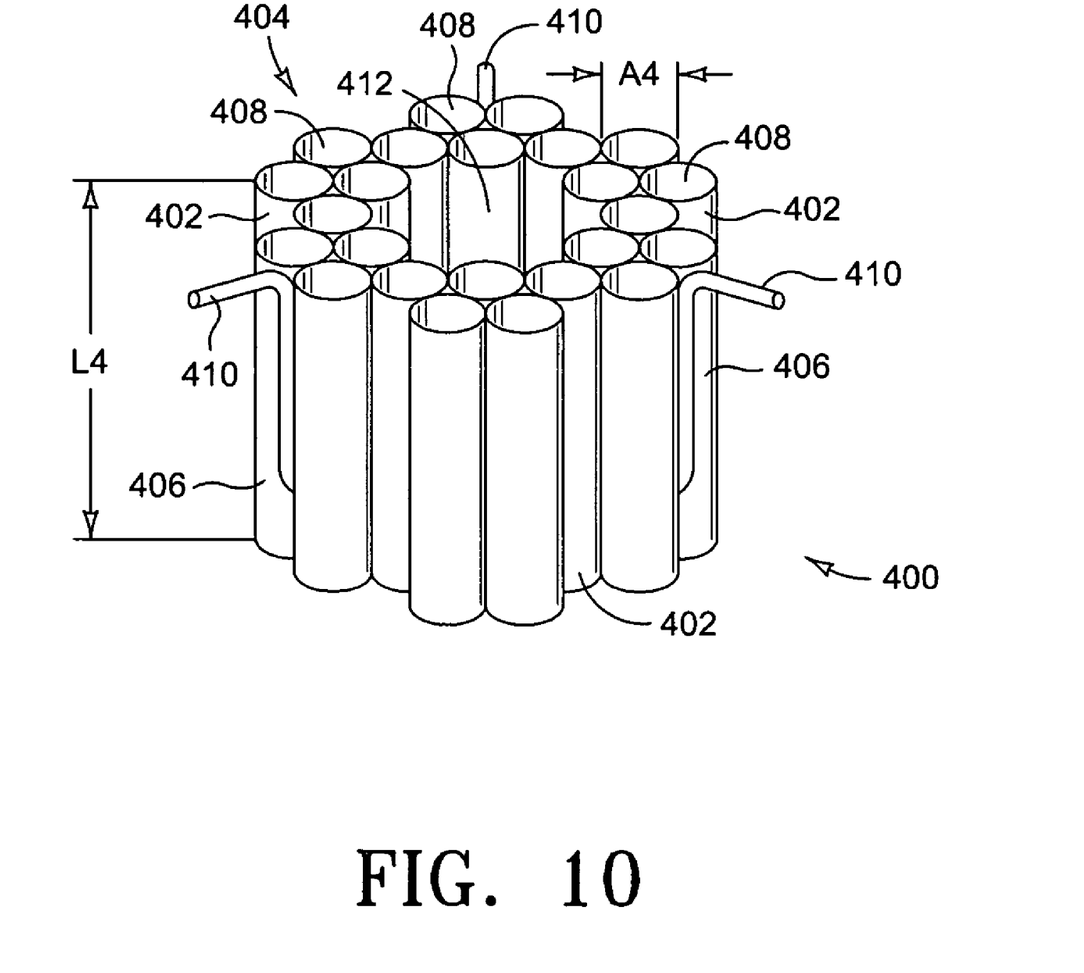
FIG. 10 is a perspective view depicting a flow laminarizing device in accordance with still another embodiment of the invention.

FIG. 10 is a perspective view depicting a flow laminarizing device 400 in accordance with still another embodiment of the invention, which is generally similar to the flow laminarizing device 100 described above. The flow laminarizing device 400 includes a plurality of tubes 402, which are coupled in a mutually parallel arrangement, defining an array or cluster 404. Each of the tubes 402 includes a wall 406, defining a passageway 408 that is configured to permit fluid flow there through. Each of the tubes 402 further includes a length L4 and cross-sectional area A4, defined by the corresponding wall 406.

The tubes 402 of the cluster 404 are further generally arranged about the periphery of, and thus define, a central passageway 412. Function of the central passageway 412 will be described in detail here after. The flow laminarizing device 400 further includes a plurality of retaining elements 410. The plurality of retaining elements 410 are typically coupled to and are uniformly distributed about the periphery of the cluster 404 of the tubes 402. The plurality of retaining elements 410 are configured to support the flow laminarizing device 400 in a substantially fixed position relative to a location of use, such as, for example, the fluid inlet (or throat) of a turbocharger (not shown) or other fluid impelling device (not shown).

The tubes 402 and the retaining elements 410 of the flow laminarizing device 400 can be formed from any material or materials suitable for the intended use, such as, for example, any of the materials described above in regard to the formation of the flow laminarizing device 100. Optionally, the flow laminarizing device 400 can be formed as a single-piece entity, of any suitable material, and by any correspondingly suitable method of formation. For example, the flow laminarizing device 400 can be formed as a single-piece, injection-molded plastic entity. In another example, the flow laminarizing device 400 can be at least partially formed of an extruded metal. Other materials and/or methods for producing the flow laminarizing device 400 are possible.

The operation and performance characteristics of the flow laminarizing device 400 are substantially similar to those described above in regard to the flow laminarizing device 100 of FIG. 3. Furthermore, the central passageway 412 is configured to permit the flow laminarizing device 400 to be positioned in relatively close, non-contacting proximity to an impeller of a turbocharger (not shown) or other fluid impelling device (not shown). This can be accomplished, for example, by receiving a portion of the impeller (not shown) into the central passageway 412. In this way, fluid (i.e., air) is introduced to the impeller (not shown) immediately upon exiting the flow laminarizing device 400, while the fluid flow still retains most or all of the laminarizing characteristic provided by the flow laminarizing device 400.

Figure 5:
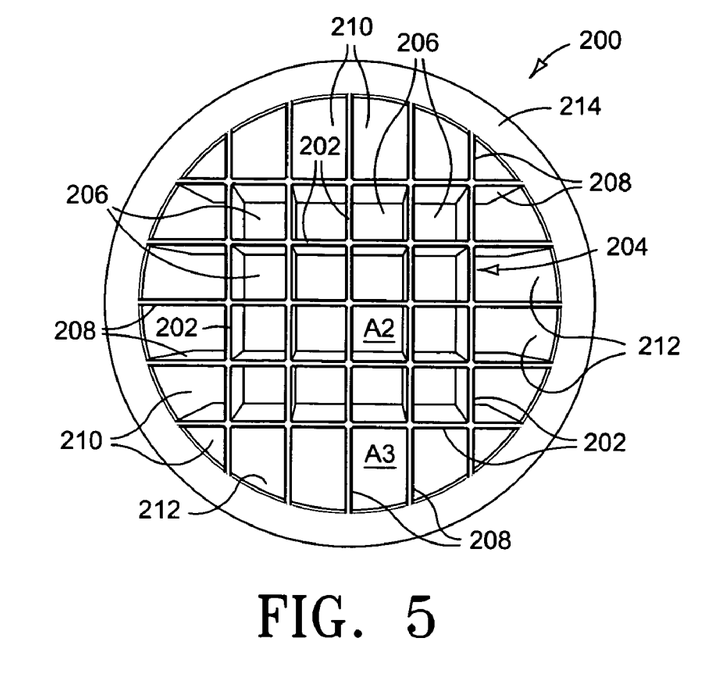
FIG. 5 is an end plan view depicting a flow laminarizing device in accordance yet another embodiment of the invention.

FIG. 5 is an end plan view depicting a flow laminarizing device 200 in accordance with yet another embodiment of the invention. The flow laminarizing device 200 includes a first plurality of first walls 202. The first walls 202 are coupled so as to define a plurality of passageways 206. The plurality of passageways 206 are substantially mutually parallel and arranged as an array 204. As depicted, each of the passageways 206 has a generally square cross-sectional area A2, in accordance with the arrangement of the particular walls 202 defining each passageway 206. It is understood that other passageways (not shown) having different cross-sectional geometries such as, for example, triangular, hexagonal, octagonal, etc., associated with other embodiments of the invention (not shown), can also be used. Accordingly, the term "wall" or "walls" as used herein should not be considered as limiting structures to open planar shapes, but is also meant to include closed shapes (such as circular, square, polygonal, elliptical, etc.)

The flow laminarizng device 200 further includes a second plurality of second walls 208. The second walls 208 are coupled with each other and with the first walls 202, and thus define a plurality of channels 210. The channels 210 are generally disposed about the periphery of the array 204 of the passageways 206. Each of the channels 210 is further defined by an open side 212. As depicted, each of the channels 210 has a generally rectangular, or triangular, open, cross-sectional area A3, in accordance with the second walls 202, the open side 212, and the first wall 202 (where applicable) defining each channel 210. It is understood that other channels (not shown) having different cross-sectional geometries such as, for example, hexagonal, octagonal, etc., associated with other embodiments of the invention, can also be used.

The flow laminarizing device 200 further includes a retaining element 214, coupled to the first and second walls 202 and 208, respectively. In this example, the retaining element 214 is formed as a ring, or annulus, and is configured to support or hold the flow laminarizing device 200 in a substantially fixed position during typical operation (shown and described hereafter).

Figure 6:
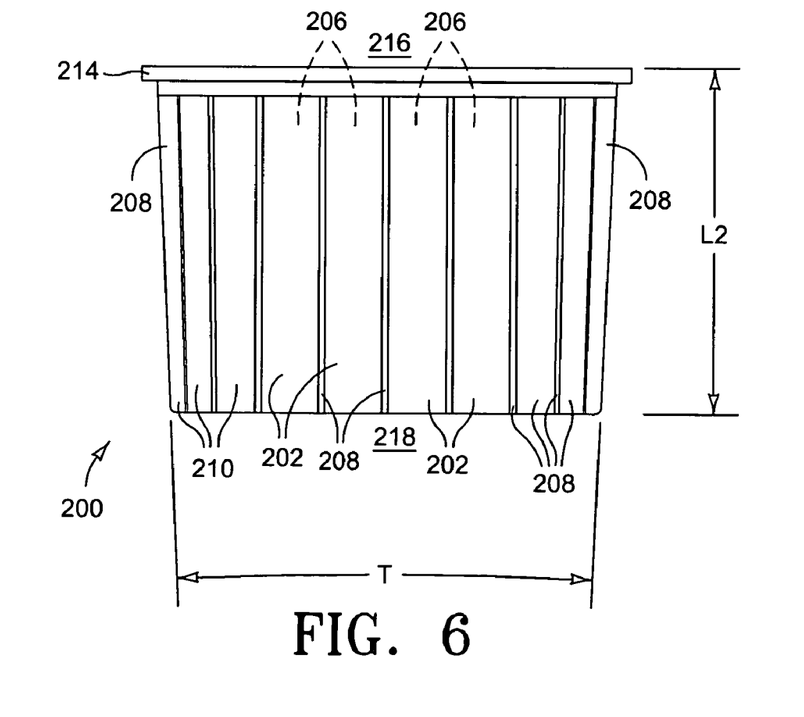
FIG. 6 is a side elevational view depicting the flow laminarizing device of FIG. 5.

FIG. 6 is a side elevational view depicting the flow laminarizing device 200 of FIG. 5. The flow laminarizing device 200 further is of a length L2, as defined by the first and second walls 202 and 208, respectively. Thus, each of the passageways 206 and channels 210 are of this length L2. The fluid laminarizing device 200 further includes a fluid entrance end 216 and a fluid exit end 218. As depicted, the fluid entrance end 216 is generally proximate to the retaining element 214, while the fluid exit end 218 is generally distal to the retaining element 214. The plurality of second walls 208 are formed (i.e., angled) such that the flow laminarizing device 200 includes a taper T, from the entrance end 216 to the exit end 218.

The flow laminarizing device 200 can be formed from any material suitable for the intended use, and is preferably formed as a single-piece entity (i.e., not from an assemblage of discrete pieces). In one preferred embodiment, the flow laminarizing device 200 is formed as a single, injection-molded plastic entity. In another embodiment, the flow laminarizing device 200 is formed in a metallic extrusion process. Other materials and methods of formation, associated with other embodiments of the flow laminarizing device 200, are possible.

Furthermore, the flow laminarizing device 200 exhibits performance characteristics that are substantially similar to those described above for the flow laminarizing device 100. For example, an increase of the length L2 of the device 200 generally corresponds to increasing both the flow laminarizing effect and the fluid drag of the device 200. As another example, an increase of the cross-sectional areas A2 and A3 generally corresponds to a decrease in both the flow laminarizing effect and fluid drag of the flow laminarizing device 200. Other general characteristic similarities can exist between the respective flow laminarizing devices 100 and 200.

It is therefore desirable to realize an embodiment of the flow laminarizing device 200 such that a ratio of the flow laminarizing effect, to the fluid drag there produced, is optimized for the application at hand—typically, laminarizing an ambient air flow into a compression chamber of a turbocharger. In one non-limiting example, the flow laminarizing device 200 includes: a length L of about 30 mm; a total of sixteen passageways 206, each having a cross-sectional area A2 of about 0.81 cm^2; and a total of twenty channels 210, each having an entrance end 216 cross-sectional area A3 in the range of about 0.18 cm^2 to about 1.1 cm^2. Other dimensions and pluralities of passageways 206 and channels 210, associated with other embodiments of the flow laminarizing device 200, are also possible.

Figure 7:
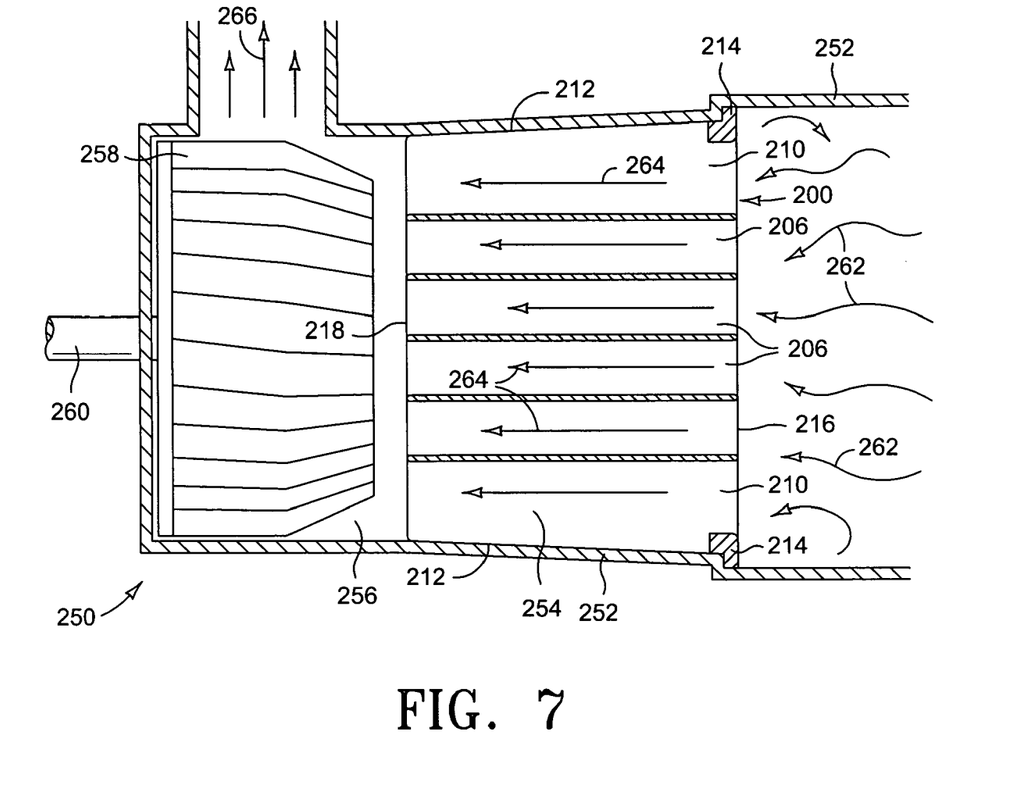
FIG. 7 is a side elevation sectional view depicting a portion of a turbocharger in combination with the flow laminarizing device of FIG. 5.

FIG. 7 is a side elevation sectional view depicting the flow laminarizing device 200 of FIG. 5 in cooperation with a portion of a turbocharger 250. The turbocharger 250 includes a housing 252, which defines an inlet 254 and a compression chamber 256. The flow laminarizing device 200 is received within the inlet 254, with the retainer element 214 cooperating with the housing 252 (in addition to other possible elements, not shown) to hold the flow laminarizing device 200 in a generally fixed position. The turbocharger 250 further includes an impeller 258 that is supported within the compression chamber 256 by way of coupling to a rotatable shaft 260.

Cooperation of the flow laminarizing device 200 and the turbocharger 250 is performed typically as follows: The shaft 260 is driven to rotation by an attached turbine (not shown) of the turbocharger 250, which in turn rotates the impeller 258. The rotating impeller 258 impels a flow of generally turbulent ambient air 262 toward the fluid entrance end 216 of the flow laminarizing device 200. The flow of the ambient air 262 divides to form a plurality of individual flow streams 264, which respectively enter the plurality of passageways 206 and channels 210 of the flow laminarizing device 200.

The individual flow streams 264 are laminarized (i.e., made more laminar, or reduced in turbulence) as they flow from the entrance end 216 to the exit end 218 of the flow laminarizing device 200. The plurality of flow streams 264 then exit the flow laminarizing device 200 and flow into the compression chamber 256 of the turbocharger 258, where they interact with the impeller 258. The impeller 258 generally compresses the ambient air 262 of the plurality of flow streams 264, such that a single, combined flow stream 266 of ambient air 262 is discharged from the turbocharger 250.

As depicted in FIG. 7, the inlet 254 of the turbocharger 250 has a general taper leading into the compression chamber 256. It is noted that this taper is accommodated by the taper T of the flow laminarizing device 200, such that the housing 252 of the inlet 254 cooperates to substantially close the open sides 212 of the channels 210 of the flow laminarizing device 200. In this way, the respective cross-sectional areas A3 of the channels 210 effectively decrease along a path from the entrance end 216 to the exit end 218. It is well known to those of skill in the art that fluid flow generally accelerates under such conditions, leading to a higher velocity at the exit end 218 than at the entrance end 216, for those flow streams 264 that flow through the channels 210. The relative velocity of the individual flow streams 264 is shown in the form of corresponding vector length within FIG. 7.

Furthermore, the individual air streams 264 flowing from the central passageways 206 typically have the lowest exit velocities, with the exit velocity of the air streams 264 generally increasing when flowing from the peripheral passageways 206 and the channels 210. This general exit-velocity characteristic is believed to improve the overall performance of the flow laminarizing device 200 in at least the following ways:

1) The higher velocity air streams 264 tend to draft, or boost, the lower velocity air streams 264, due to respectively different static pressures; and 2) The peripheral, higher velocity air streams 264 tend to desirably interact with the features of the impeller 258 which are moving with the greatest linear (i.e., tangential) velocity.

Other performance benefits attributable to the taper T of the flow laminarizing device 200 can also be present or realized. In any case, the flow laminarizing device 200 generally improves, and can substantially optimize, the performance ratio of the turbocharger 250 for reasons similar to those described above for the flow laminarizing device 100 of FIG. 2.

Although the flow laminarizing devices 100 and 200 have been exemplarily shown as being used with a turbocharger, it will be appreciated that the devices can also be used on the air inlet to a supercharger (which is directly mechanically driven by a belt or gears or the like, rather than being driven by exhaust gasses).

Figure 8:
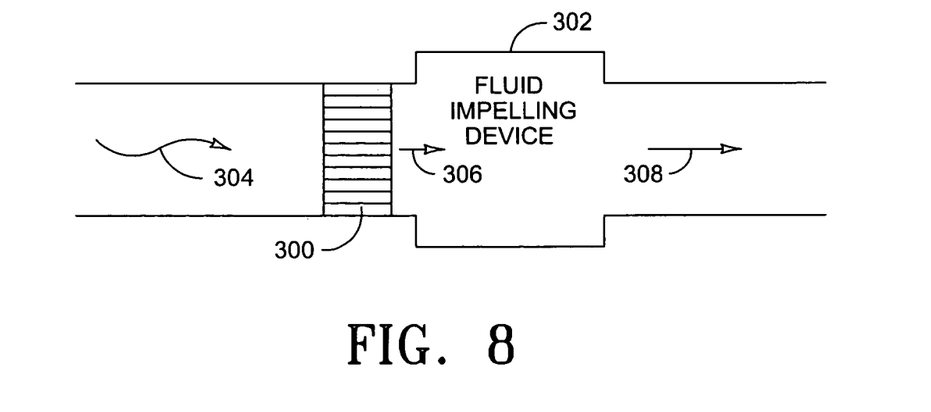
FIG. 8 is a schematic view depicting a flow laminarizing device in combination with a fluid impelling device in accordance with yet another embodiment of the invention.

FIG. 8 is a schematic view depicting a flow laminarizing device 300, operating in conjunction with a generic fluid impelling device 302. The flow laminarizing device 300 is understood to be generic to the instant invention, and includes a plurality of passageways and/or channels (not shown), which are formationally and characteristically similar to those described above for the flow laminarizing devices 100 and 200.

In operation, a fluid (i.e., liquid or gas) 304, having a generally turbulent flow characteristic, flows toward the flow laminarizing device 300, and passes there through. The flow laminarizing device 300 substantially reduces the turbulence (i.e., laminarizes) of the fluid, resulting in the generally laminarized flow 306 of the fluid 304. The laminarized flow 306 of the fluid 304 enters the fluid impelling device 302, where it interacts with an impeller (not shown), resulting in compression and/or flow induction of the fluid 304. The fluid 304 then exits the fluid impelling device 302 as an exit flow 308.

The fluid 304 of the exit flow 308 generally has a higher static pressure, upon exiting the fluid impelling device 302, than does the fluid 304 of the laminarized flow 306. As described above, the ratio of the exit flow 308 pressure, to the laminaried (i.e., inlet) flow 306 pressure, is referred to herein as the performance ratio of the fluid impelling device 302, and is generally considered to provide an overall benchmark, or standard, by which to evaluate the performance of the generic fluid impelling device 302.

The flow laminarizing device 300 is used in conjunction with the fluid impelling device 302, so as to increase, or optimize, the performance ratio of the fluid impelling device 302, by substantially reducing or eliminating the undesired effects of introducing the turbulent flow of fluid 304 directly to the generic fluid impelling device 302. These undesired effects can include, but are not limited to, drag due to counter-rotation of the fluid flow with respect to the rotation of the impeller, and a less-than-optimum velocity profile of the fluid flow, etc.

Figure 9A:
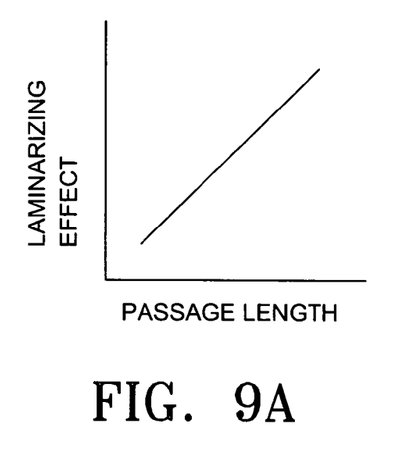
FIGS. 9A–9F are linearized graphs respectively depicting various performance characteristics associated with a flow laminarizing device in accordance with the present invention.

FIG. 9A is a linearized, graphical representation depicting the general correspondence between the laminarizing effect, and the passageway or channel length, of a flow laminarizing device (not shown) generic to the instant invention. In general, an increase of passageway or channel length typically results in an increase of the laminarizing effect of the associated flow laminarizing device.

Figure 9B:
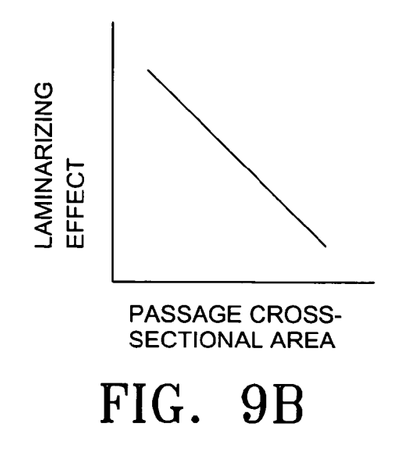

FIG. 9B is a linearized, graphical representation depicting the general correspondence between the laminarizing effect, and the passageway or channel cross-sectional area, of a flow laminarizing device (not shown) generic to the instant invention. In general, an increase of passageway or channel cross-sectional area typically results in a decrease in the laminarizing effect of the associated flow laminarizing device.

Figure 9C:
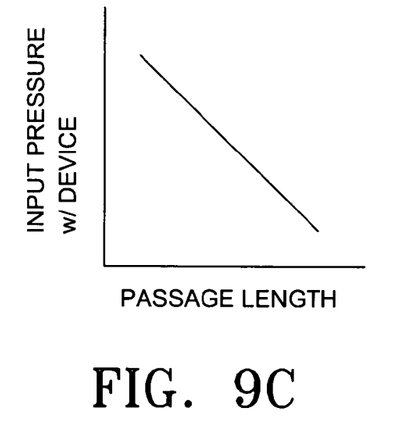

FIG. 9C is a linearized, graphical representation depicting the general correspondence between the static pressure of a laminarized fluid entering a generic fluid impelling device (not shown), and the passageway or channel length of a flow laminarizing device (not shown) generic to the instant invention. In general, an increase in the passageway or channel length results in a decrease in the static pressure of the fluid entering the fluid impelling device (and after passing through the flow laminarizing device).

Figure 9D:
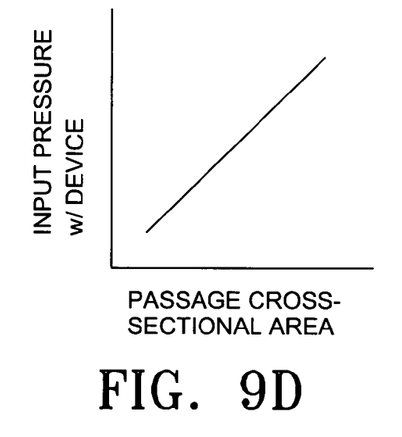

FIG. 9D is a linearized, graphical representation depicting the general correspondence between the static pressure of a laminarized fluid entering a generic fluid impelling device (not shown), and the passageway or channel cross-sectional area of a flow laminarizing device (not shown) generic to the instant invention. In general, an increase in the passageway or channel cross-sectional area results in an increase in the static pressure of the fluid entering the fluid impelling device (and after passing through the flow laminarizing device).

Figure 9E:
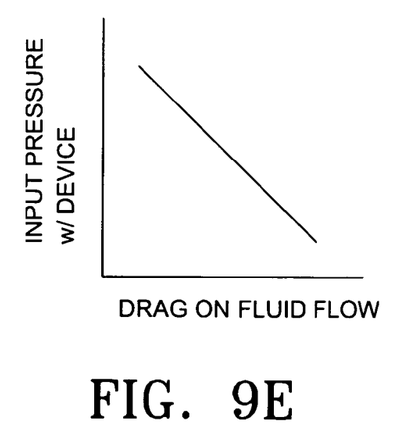

FIG. 9E is a linearized, graphical representation depicting the general correspondence between the static pressure of a laminarized fluid entering a generic fluid impelling device (not shown), and the drag on that fluid (resulting from wall roughness) as it flows through a flow laminarizing device (not shown) generic to the instant invention. In general, an increase in drag on the flowing fluid (corresponding to an increase in the coefficient of drag on the wall surface) results in a decrease in the static pressure of that fluid as it enters the fluid impelling device.

Figure 9F:
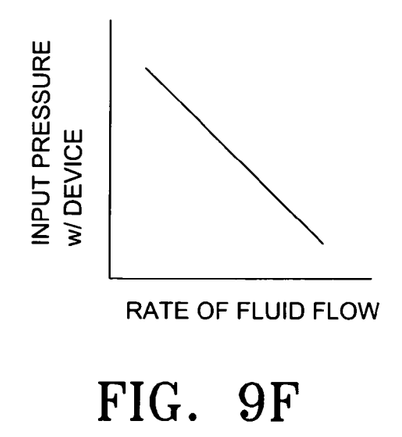

FIG. 9F is a linearized, graphical representation depicting the general correspondence between the static pressure of a laminarized fluid entering a generic fluid impelling device (not shown), and the rate of flow of that fluid through a flow laminarizing device (not shown) generic to the instant invention. In general, an increase in rate of fluid flow results in a decrease in the static pressure of that fluid as it enters the fluid impelling device after passing through the flow laminarizing device.

FIGS. 9A–9F are not intended as representing empirical data, but are only depicted to show the general relationship between the design variables and the performance characteristics of a flow laminarizing device in accordance with the present invention. In designing such a flow laminarizing device, the length of the walls (or fluid passageways), as well as the inner circumference of the passageways, are optimized to increase the laminarizing effect on the fluid, and thus efficiency of a device using the laminarized flow, while at the same time reducing the pressure loss imposed on the fluid by the flow laminarizing device. Surface roughness of the wall surfaces of the flow laminarizing device should be reduced whenever practical, and can be achieved by using materials have low drag coefficients after being formed (such as extruded TFE), or by being polished.

One method for designing a flow laminarizing device in accordance with the present invention is to select a number of fluid passageways and a length for the device. The length is preferably selected to be longer than is believed reasonable. The device can then be placed in the inlet to a centrifugal compressor, and the compressor driven at a fixed rotational speed. The pressure of the air exiting the compressor (discharge pressure) is then measured as is compared to a base-line measurement made without the device in place. The length of the device can then be shortened by a selected increment (as by cutting, for example), and the discharge pressure measured again with the shortened device in place. Generally, the discharge pressure will increase as the length of the device is shortened. However, at a certain point the discharge pressure will start to drop as the device becomes "too short" to produce a useful laminarizing effect. When this occurs, then the last selected length is the near-optimum length of this device.

Once a near-optimum length for the device is determined (as just discussed), then the near-optimum number of passageways can be determined. Preferably, the initial number of passageways selected is greater than what is believed to be practical. The number of passageways can then be incrementally decreased, and the effect on the discharge pressure observed with the altered device. As with the length determining process, the discharge pressure will be observed to increase as the number of passageways is decreased. However, at a certain point the discharge pressure will start to decrease as the number of passageways are decreased, indicating a loss of flow laminarizing benefit fro the device. The last-used number of fluid passageways will then be the near-optimum number of fluid passageways.

It will be appreciated that the above iterative design method is practical for designing a flow laminarizing device in accordance with the present invention due to the variables inherent in the system in which the device will be used, as well as the difficulties of performing fluid flow calculations for compressible fluids. However, the design process can also be performed on a computer using compressible fluid flow design software, such as "PIPE-FLO Compressible", available from Engineered Software, Inc. of Lacey, Wash., U.S.A.

It will also be appreciated that a similar design methodology is applied when the flow laminarizing device under consideration is to be used on the inlet side of a turbine, when energy is to be extracted from the fluid (such as on the driving side of a turbocharger, or the inlet to a turbine in a hydraulic power generator), rather than energy being input into the fluid. In the instance where energy is being extracted from the fluid, rather than driving the turbine at a fixed speed and measuring outlet pressure of the fluid from the turbine, the turbine can be free-wheeling and the rotational speed of the turbine can be measured as the flow laminarizing device is altered (i.e., length shortened and number of passageways decreased). In general, the rotational speed will increase as these two variables are altered up to a certain point, at which point the rotational speed will start to decrease as the flow laminarizing effect is lost. The design points where the rotational speed ceases to increase and starts to decrease are the near-optimal design points.

From the foregoing it will be appreciated that another embodiment of the present invention provides for a method for using a turbocharger including an impeller. The method includes laminarizing a flow of air or gas using a flow laminarizing device, and providing the laminarized flow of air or gas to the impeller of the turbocharger. Yet another embodiment provides for a method for using a diesel engine including a turbocharger. In this latter embodiment a flow of combustion gasses is received from the diesel engine at the turbocharger, and a flow of ambient air is received at the turbocharger. The method includes laminarizing at least one of the flow of combustion gasses or the flow of ambient air prior to the receiving at the turbocharger using a flow laminarizing device. Still another embodiment of the present invention provides for a method for using a fluid impelling device. This method includes laminarizing a fluid flow using a flow laminarizing device, and providing the laminarized fluid flow to the fluid impelling device.

Figure 11:
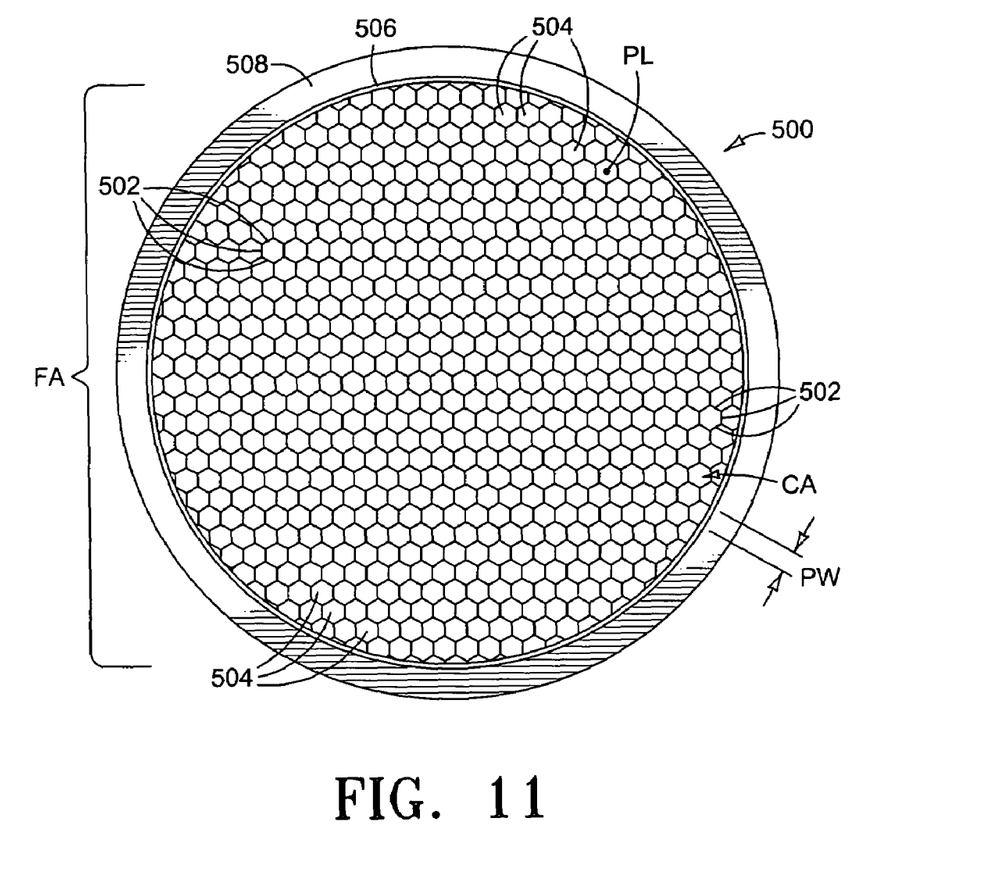
FIG. 11 is an isometric view depicting a flow laminarizing device in accordance with yet another embodiment of the invention.

FIG. 11 is a front elevation view depicting a flow laminarizing device 500 in accordance with yet another embodiment of the present invention. The flow laminarizing device 500 includes a plurality of wall elements (hereinafter, walls) 502. The walls 502 can be formed of any suitable, substantially rigid material such as, for example, stainless steel, aluminum, titanium, etc. In a preferred embodiment, the walls 502 are formed from stainless steel including a thickness (i.e., wall thickness) of about 0.004 inches. Other suitable materials and/or thicknesses can also be used to form the walls 502. The walls 502 are depicted in FIG. 11 in an edgewise orientation with respect to the viewer, and are understood to extend lengthwise into the sheet.

The walls 502 are configured to define a plurality of substantially parallel passageways 504. Each passageway 504 is configured to permit fluid flow there through. Each of the passageways 504 defines a passage width "PW", a hexagonal cross-sectional area "CA" and a passage length "PL" (compare with the casing length "CL" of FIGS. 12 and 13). In one implementation of the flow laminarizing device 500, the passage width PW of each passageway 504 is about 0.125 inches, and the passage length PL of each passageway 504 is about 0.875 inches. Thus, in such an implementation, the ratio of passage length PL to passage width PW for each passageway 504 is about 7:1. Furthermore, the passage width PW and the passage length PL is substantially equal for all passageways 504 of the flow laminarizing device 500 depicted in FIG. 11. Other implementation including other passage widths PW, passage lengths PL, and/or passage length to passage width ratios can also be used. In any case, the passage length PL of each passageway 504 is understood to extend into the sheet as depicted in FIG. 11. In one or more embodiments of the flow laminarizing device 500, the plural walls 502 are mutually defined by a single-piece metallic entity such that the passageways 504 are substantially defined and configured as a tiled grid or matrix of through-apertures.

The flow laminarizing device 500 also includes a casing 506. The casing 506 can be formed from any suitable material such as, for example, those described above in regard to the plurality of walls 502. In one example, the casing 506 is formed from (i.e., defined by) a stainless steel tube. Other suitable materials can also be used. The casing 506 is configured to mechanically support the plurality of walls 502. As depicted in FIG. 11, the casing 506 substantially surrounds the walls 502 and the passageways 504 thus defined. The casing 506 defines a casing length "CL" that is understood to extend into the sheet as depicted in FIG. 11. In one example of the present embodiment of the flow laminarizing device 500, the casing length CL of the casing 506 is substantially equal to the passage length PL of each of the passageways 504. Therefore, in such an example the casing 506 defines a casing length CL of about 0.875 inches. Other embodiments of the flow laminarizing device 500 including other casing lengths CL can also be used.

The flow laminarizing device 500 further includes a support extension 508. As depicted in FIG. 11, the support extension 508 is defined by a ring, or annulus, mechanically coupled to the casing 506. The support extension 508 can be formed from any suitable material such as, for example, any of those materials described above in regard to the casing 506. In one example of the flow laminarizing device 500, the support extension 508 is formed from stainless steel. Other suitable materials can also be used. The support extension 508 is disposed along the casing length CL aspect of the casing 506 and is mechanically affixed thereto at least 20% of the casing length away from both a first end and a second end of the casing. In another embodiment (not shown), the casing 506 and the support extension 508 are formed as a single-piece entity (by way of a casting operation, etc.). In still another embodiment (not shown), the flow laminarizing device 500 includes one or more discrete support extensions generally defined by radially disposed tabs, which are mechanically affixed to the casing 506.

The casing 506 and the support extension 508 are cooperatively configured such that the flow laminarizing device 500 can be slidingly received, at least in part, within an inlet or outlet (i.e., fluid flow port) of a fluid impelling device (such as, for example, a turbocharger or supercharger of an engine, not shown), and supported in a substantially fixed position with respect to the fluid impelling device. In such a typical usage arrangement the flow laminarizing device 500 is generally considered to be installed within the fluid impelling device (not shown) while the support extension 508 is in resting contact with a lip or flange-like portion of the fluid impelling device.

The flow laminarizing device 500 further defines a characteristic referred to as porosity. Generally, porosity refers to that fraction of the overall cross-sectional area of a device that is available as a fluid flow passageway, or the sum of individual fluid flow passageways, when that device is installed within a fluid flow conduit or other fluidly communicable circuit. Typically, porosity is expressed as a percentage. As used herein, porosity is defined as the ratio of the sum total of the individual cross-sectional areas CA of the plural passageways 504, to the overall cross-sectional area of the flow laminarizing device 500 depicted as frontal area "FA" in FIG. 11. The porosity of any given embodiment of the flow laminarizing device 500 is a percentage less than 100% as a result of the fraction of the frontal area "FA" that is obstructed by the edgewise or thickness aspect of the plurality of walls 502.

In one or more embodiments of the flow laminarizing device 500, the defined porosity is equal to or greater than 95%. In some other embodiments of the flow laminarizing device 500, the defined porosity is equal to or greater than 90%. Other embodiments of the flow laminarizing device 500 defining other porosities can also be used. In any case, I have found that an increased porosity value generally corresponds to a more laminarized flow being produced as fluid flows through the passageways 504 of the flow laminarizing device 500.

Figure 12:
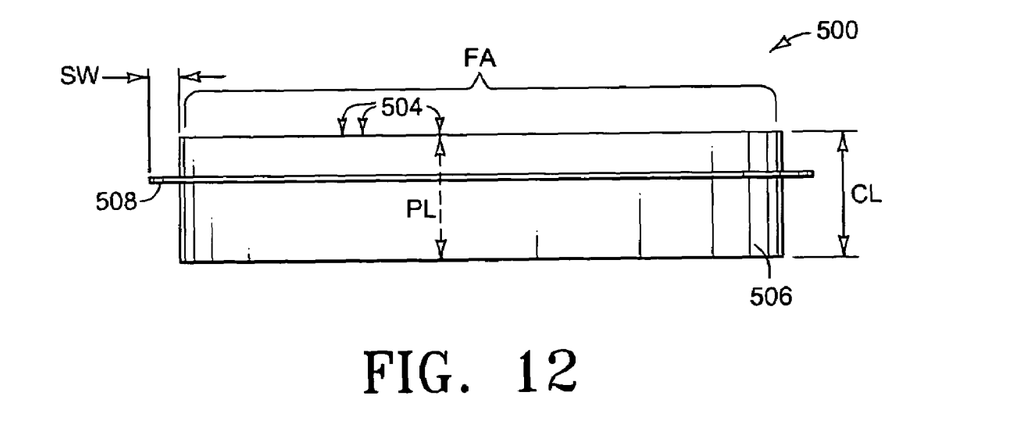
FIG. 12 is a plan view depicting the flow laminarizing device of FIGS. 11

FIG. 12 is a side elevation view depicting the flow laminarizing device 500 of FIG. 11. As depicted in FIG. 12, the support extension 508 defines a support width "SW" that extends radially away from casing 506. Further depicted in FIG. 12 are the casing length CL of the casing 506, an indication to the passageways 504, the frontal area FA, and the passage length PL of each passageway 504 as respectively described above in regard to the flow laminarizing device 500 of FIG. 11. It will be appreciated that the frontal area is in fact the diameter dimension "FA" shown in FIG. 13 applied to the equation for area of a circle (area=$\pi D^2/4$, where D=FA).

Figure 13:
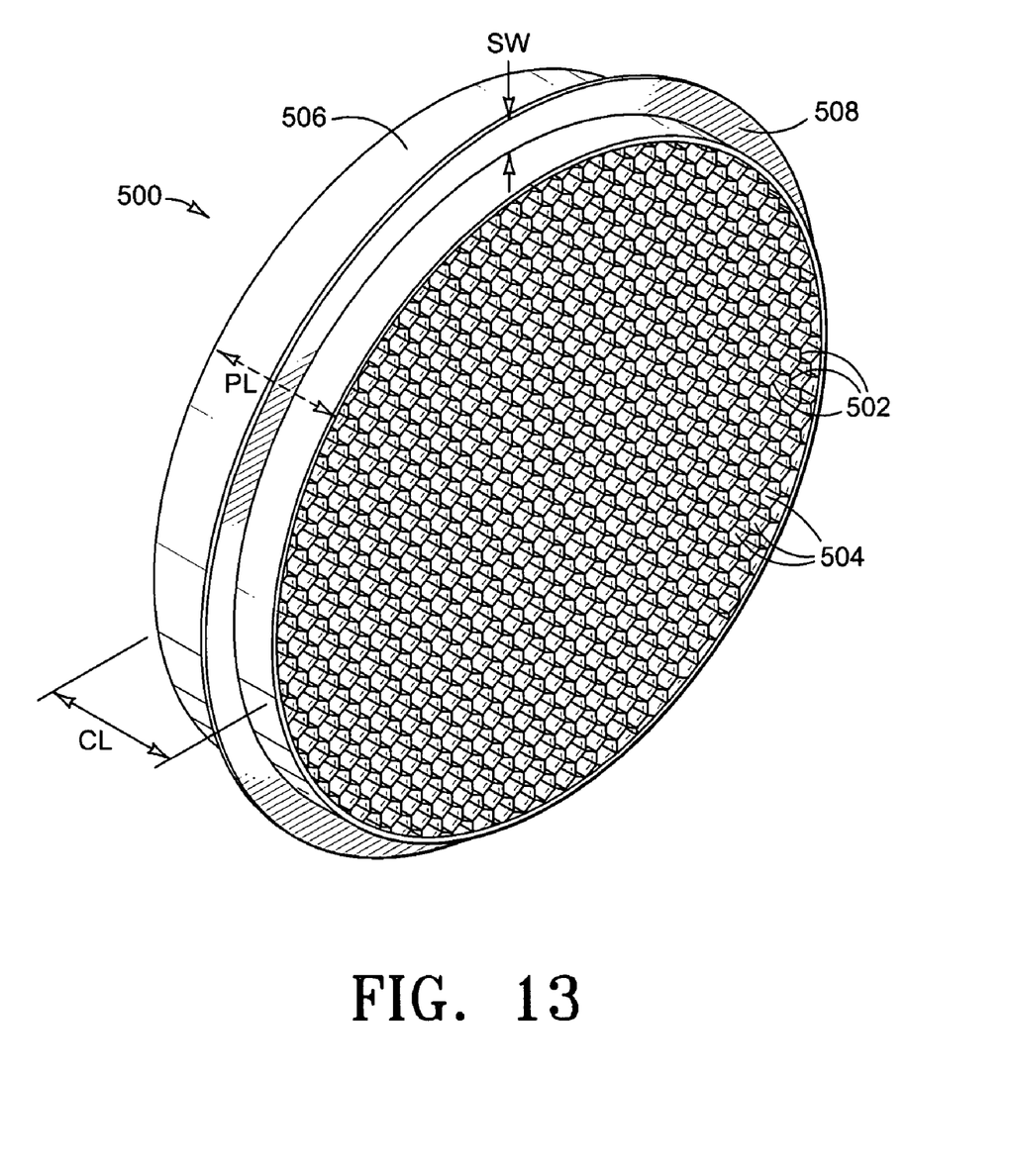
FIG. 13 is a side elevational view depicting the flow laminarizing device of FIG. 11.

FIG. 13 is a perspective view depicting the flow laminarizing device 500 of FIG. 11. The FIG. 13 depicts the plural walls 502, the plurality of passageways 504, the casing 506, the support extension 508, the support width SW, the casing length CL, and the passage length PL as respectively described above in regard to the flow laminarizing device 500 of FIG. 11.

Typical installation and operation of the flow laminarizing device 500 (FIGS. 11–13) is as follows: to begin, it is assumed that an automobile, truck, or other vehicle (not shown) is provided including an engine (e.g., diesel type, conventional gasoline type, etc.) and a turbocharger or a supercharger (i.e., fluid impelling device), such that the turbocharger (or supercharger) is configured to promote the flow of combustion air into the engine cylinders and/or the flow of exhaust gasses from the engine cylinders. Assuming such a provision, an air feed line or conduit is first temporarily disconnected (decoupled) from an air intake port of the turbocharger or supercharger. Typically, the disconnection of the air feed line is enabled by loosening and/or removing some form of conventional hose clamp or other reusable coupling hardware.

Next, the flow laminarizing device 500 (FIGS. 11–13) is slidingly received (i.e., inserted), at least in part, into the air intake port of the turbocharger or supercharger. As a generally analogous example, see the flow laminarizing device 100 received into the inlet 114 of the turbocharger 112 of FIG. 4. The flow laminarizing device 500 (FIGS. 11–13) is sufficiently inserted so as to bring the support extension 508 into resting contact with a lip or flange-like area of the air intake port of the turbocharger or supercharger. The flow laminarizing device 500 is now generally considered to be in its operative position relative to the turbocharger or supercharger (i.e., fluid impelling device).

Thereafter, the air feed line is re-coupled to the air intake port of the turbocharger or supercharger. At this point, the flow laminarizing device 500 (FIGS. 11–13) is considered to be fully installed in a substantially fixed, cooperative orientation with the turbocharger or supercharger of the automobile (not shown). Now, the vehicle can operated as desired with the added benefits as provided by the flow laminarizing device 500.

Such benefits, some of which are described in further detail hereinafter, include for example increased combustion air flow to the engine, increased overall combustion of fuel, improved engine power, reduced unburned fuel within the exhaust gases, reduced overall fuel consumption during typical operation, etc. It is to be understood that various appropriate embodiments of the flow laminarizing device 500 of FIGS. 11–13 are readily applicable to automobiles and/or other engine-equipped machinery in a relatively simple, retrofit type of installation process without the need for other substantial alterations to the receiving automobile and/or other machinery (e.g., cutting or grinding of existing components, drilling holes, breaking and/or reforming welds in metallic elements, etc.).

It is to be understood that other appropriate installation and/or usage methods and procedures, not specifically elaborated herein, can also be used in conjunction with various embodiments of the flow laminarizing device 500 of FIGS. 11–13. Such methods and procedures are obvious to one of skill in the mechanical arts by virtue of the particular teachings and examples provided herein.

Figure 14:
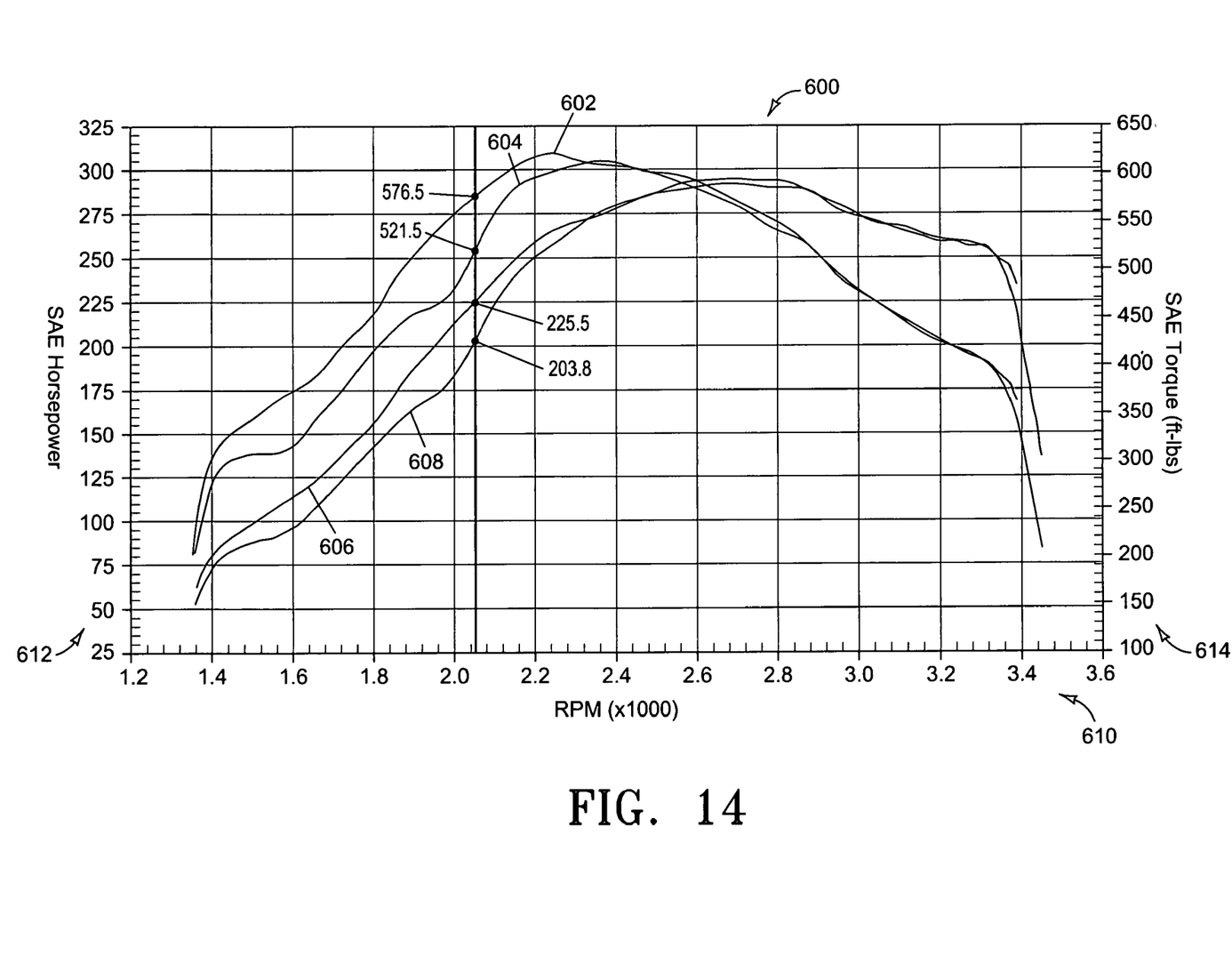
FIG. 14 is a graphical depiction relating to usage performance of the flow laminarizing device of FIG. 11.

FIG. 14 is a graph 600 depicting usage performance associated with the flow laminarizing device 500 of FIGS. 11–13. The graph 600 represents data from four separate tests depicted as respective data series 602, 604, 606 and 608. The graph 600 further includes an axis 610 representing engine RPM (revolutions per minute), an axis 612 representing measured engine SAE horsepower, and an axis 614 representing measured SAE engine torque (in foot-pounds).

The data series 602, 604, 606 and 608 were respectively gathered by way of dynamometer tests performed on a Ford model F-250™ pickup truck, model year 2001, including a diesel engine displacement rating of 7.3 liters. Such a pickup truck is/was available from Ford Motor Company, Dearborn, Mich. 48121. The data series 602 represents measured SAE engine torque with an embodiment of the flow laminarizing device 500 of FIGS. 11–13 installed within the test vehicle, while the data series 604 represents measured SAE engine torque without the use of a flow laminarizing device. The data series 606 represents measured SAE engine horsepower with an embodiment of the flow laminarizing device 500 of FIGS. 11–13 installed within the test vehicle, while the data series 608 represents measured SAE engine horsepower without the use of a flow laminarizing device.

As can be seen in the graph 600, a comparison of the data series 602 and 604 indicates that SAE engine torque is improved (increased) when using the flow laminarizing device 500 of FIGS. 11–13, relative to operation of the same test vehicle without a flow laminarizing device. Exemplary data points within the data series 602 and 604 indicate measured SAE engine torques of 576.5 and 521.5 foot-pounds, respectively, when the test vehicle was being operated at approximately 2,050 RPM. Thus, at this particular test RPM use of the flow laminarizing device 500 of FIGS. 11–13 resulted in an increased measured SAE engine torque of about 55 foot-pounds, or approximately 10.6%.

Similarly, a comparison of the data series 606 and 608 indicates that SAE engine horsepower is improved (increased) when using the flow laminarizing device 500 of FIGS. 11–13, relative to operation of the same test vehicle without a flow laminarizing device. Exemplary data points within the data series 606 and 608 indicate that measured SAE engine horsepowers of 225.5 and 203.8, respectively, when the test vehicle was being operated at approximately 2,050 RPM. Therefore, at this particular test RPM, use of the flow laminarizing device 500 of FIGS. 11–13 resulted in an increased measured SAE engine horsepower of about 21.7 horsepower, or approximately 10.7%.

In any case, it is to be further noted that the greatest relative differences within the respective measured SAE torque and SAE horsepower data series 602–608 occur at about 2,000 RPM, which generally coincides with typical engine RPM under highway operating conditions. Thus, peak improved relative performance and its corresponding benefits (e.g., reduced overall fuel consumption and/or exhaust emissions, etc.) while using the flow laminarizing device 500 of FIGS. 11–13 tend to occur at, or within the general area of, typical on-the-road operating conditions.

While the above methods and apparatus have been described in language more or less specific as to structural and methodical features, it is to be understood, however, that they are not limited to the specific features shown and described, since the means herein disclosed comprise preferred forms of putting the invention into effect. The methods and apparatus are, therefore, claimed in any of their forms or modifications within the proper scope of the appended claims appropriately interpreted in accordance with the doctrine of equivalents.

I claim:

1. A flow laminarizing device, comprising:
   a plurality of walls configured to define at least one hundred passageways, each passageway configured to permit a fluid flow there through, each passageway defined by a passage length and a passage width and a hexagonal cross-sectional area, wherein the ratio of passage length to passage width for each passageway is about 7:1;
   a casing configured to support the plurality of walls, the casing defined by a casing length and first and second opposite ends; and
   a support extension coupled to the casing and configured to support the flow laminarizing device in a partially slidingly received position with respect to a fluid flow port of a fluid impelling device, wherein the support extension is disposed along the casing length at least 20% of the casing length away from both the first end and the second end of the casing.

2. The device of claim 1, wherein the support extension is defined by an annulus concentrically disposed about the casing.

3. The device of claim 1, wherein the flow laminarizing device is configured to define a porosity of at least 90%.

4. The device of claim 1, wherein the flow laminarizing device is configured to define a porosity of at least 95%.

5. The device of claim 1, wherein the plurality of walls is configured such that at least two hundred of the passageways are thus defined.

6. The device of claim 1, wherein the plurality of walls is configured such that at least three hundred of the passageways are thus defined.

7. A flow laminarizing device, comprising:
   plural wall means for defining a plurality of passageways, the plural wall means configured such that each passageway is defined by a passage length and passage width, the ratio of passage length to passage width for each passageway being about 7:1;
   casing means for supporting the plural wall means, the casing means defined by a length and first and second opposite ends; and
   support extension means for supporting the flow laminarizing device in partially slidingly received position with respect to a fluid flow port of a fluid impelling device, the support extension means disposed at least 20% of the length away from both the first and second ends of the casing means.

8. The device of claim 7, wherein the plural wall means define at least two hundred of the passageways.

9. The device of claim 7, wherein the plural wall means define at least three hundred of the passageways.

10. The device of claim 7, wherein the flow laminarizing device defines a porosity of at least 90%.

11. The device of claim 7, wherein the flow laminarizing device defines a porosity of at least 95%.

* * * * *